United States Patent
Filla et al.

(10) Patent No.: US 8,972,111 B2
(45) Date of Patent: *Mar. 3, 2015

(54) ARTICULATED VEHICLE WITH A CONTROLLABLE WHEEL ROUTE

(75) Inventors: Reno Filla, Eskilstuna (SE); Joakim Unneback, Eskilstuna (SE); Bobbie Frank, Eskilstuna (SE); Andreas Nordstrand, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,881

(22) PCT Filed: May 6, 2011

(86) PCT No.: PCT/KR2011/003379
§ 371 (c)(1),
(2), (4) Date: Nov. 6, 2013

(87) PCT Pub. No.: WO2012/153876
PCT Pub. Date: Nov. 15, 2012

(65) Prior Publication Data
US 2014/0088834 A1    Mar. 27, 2014

(51) Int. Cl.
*G06F 17/00* (2006.01)
*B62D 12/00* (2006.01)

(52) U.S. Cl.
CPC ..................... *B62D 12/00* (2013.01)
USPC ............... 701/41; 192/38; 475/151; 475/204

(58) Field of Classification Search
CPC ...... B62D 6/002; B62D 7/1509; B62D 12/00; F16D 41/086
USPC ........................ 701/41; 192/38; 475/151, 204
See application file for complete search history.

(56) References Cited

U.S. PATENT DOCUMENTS 5,076,382 A * 12/1991 Vaughn et al. ................ 180/413
6,652,407 B2 * 11/2003 Ronk et al. .................... 475/204
(Continued)

FOREIGN PATENT DOCUMENTS

JP    10-119809 A    5/1998
JP    08-202448 A    8/1998
(Continued)

OTHER PUBLICATIONS

International Search Report (Feb. 28, 2012) for corresponding International Application PCT/KR2011/003379.
(Continued)

*Primary Examiner* — McDieunel Marc
(74) *Attorney, Agent, or Firm* — WRB-IP LLP (57) ABSTRACT

An articulated vehicle with a controllable wheel route includes a first vehicle body, a first pair of wheels, which are individually suspended on both sides of the first vehicle body, and can travel on the ground, a second vehicle body hingedly connected to the first vehicle body, a second pair of wheels, which are individually suspended on both sides of the second vehicle body, and can travel on the ground, a regulator, which regulates a relative steering angle between the first vehicle body and the second vehicle body, a mode selector, which is configured to select a first mode and a second mode, and a controller, which receives the first mode signal or the second mode signal from the mode selector and controls the regulator according to the received signal. The route of a second pair of wheels is regulated to be identical to the route of a first pair of wheels in the first mode, and the route of a second pair of wheels is regulated to be different from the route of a first pair of wheels in the second mode.

9 Claims, 4 Drawing Sheets

(56) References Cited

U.S. PATENT DOCUMENTS

| | | | |
|---|---|---|---|
| 7,229,139 B2* | 6/2007 | Lu et al. | 303/140 |
| 2002/0155914 A1* | 10/2002 | Williams et al. | 475/151 |
| 2005/0206234 A1* | 9/2005 | Tseng et al. | 303/146 |
| 2005/0236894 A1* | 10/2005 | Lu et al. | 303/139 |
| 2006/0055129 A1* | 3/2006 | Amano | 280/5.507 |
| 2006/0076828 A1* | 4/2006 | Lu et al. | 303/146 |
| 2014/0081523 A1* | 3/2014 | Filla et al. | 701/41 |

FOREIGN PATENT DOCUMENTS

| | | |
|---|---|---|
| JP | 11-245839 A | 9/1999 |
| JP | 2004-009930 A | 1/2004 |
| KR | 10-0865515 B1 | 10/2008 |

OTHER PUBLICATIONS

International Preliminary Report on Patentability (Aug. 1, 2013) for corresponding International Application PCT/KR2011/003379.

* cited by examiner

ARTICULATED VEHICLE WITH A CONTROLLABLE WHEEL ROUTE

BACKGROUND AND SUMMARY

The present invention relates to an articulated vehicle, more particularly, to an articulated vehicle which can enhance the operation capability over severe terrain that the ground is rough and winding and reduce fuel consumption. References to "the invention" herein should be understood to be references to one or more aspects of the invention.

Construction vehicles as construction equipments have been developed in various shapes to satisfy various demands for providing necessary functions at the work site under various environmental conditions and for effectively displaying individual functions even in severe conditions.

As a representative example of such construction vehicles, there are vehicles being operated while loaded. Such vehicles are generally classified into an articulated dump truck and a rigid dump truck.

An articulated dump truck refers to a vehicle wherein the vehicle body for accommodating the load is connected by a plurality of modules. A rigid dump truck refers to a vehicle in the shape of a body. Specifically, the present invention relates to an articulated vehicle. Such an articulated vehicle is basically operated in a normal condition. When an articulated vehicle is operated in severe conditions, however, there would be many difficulties in operation itself. Particularly, in the event an articulated vehicle is operated in the area that the terrain is seriously curved or the ground is not firm, there would be substantial difficulties in operating the articulated vehicle due to many variables. Below is an example of such case:

When the wheels of an articulated vehicle pass over the ground that is neither flat nor firm or is severely curved and rough, the center of gravity of the vehicle may be moved considerably toward one side. Thus, it would be difficult to keep its balance. In a worse case, it may lead to vehicle overturn. A repetitive operation in such terrain will cause a problem, such as giving a shock to a driver. Accordingly, safety and terrainability of a vehicle will be considerably lowered.

In addition, under this situation, several wheels of the vehicle body fail to be in sufficient contact with the ground, and thus they cannot display their traction force or will be spinning with no traction, which may result in difficulty in operation. In order to solve these problems, a leveling arrangement may be used. The leveling arrangement prevents the center of gravity of a vehicle from leaning rapidly toward one side on the ground that is not flat to secure stability of the vehicle. Specifically, the leveling arrangement regulates the height of the axle connected to each of the right and left wheels so that the vehicle maintains level.

However, if a vehicle is equipped with the leveling arrangement, the manufacturing costs will considerably increase. Moreover, it is not easy to control the leveling arrangement, and it is not guaranteed that a vehicle equipped only with the leveling arrangement will be stably operated. Accordingly, when an articulated vehicle is operated, it is important to prepare a measure for reduction in fuel consumption, as well as smooth steering or maintenance of vehicle stability. Normal articulated vehicles are configured such that each wheel is connected to an axle fixed on the vehicle body to travel on the rotational axis of the axle, and vehicle bodies are adjacently connected without relative rotation.

In the articulated vehicles, in which such a type of wheel is formed, when each vehicle travels straight ahead, the wheels of the following vehicle are operated according to the route of the wheels of the preceding vehicle. Thus, the wheels are not dragging. However, when traveling on a severely curved or rough ground, each of the wheels of the connected vehicles rolls toward the traveling direction and creates traction on its own. Thus, at least one vehicle wheel is dragging. Since such dragging considerably increases fuel consumption, a measure for solving this problem is required. Furthermore, when an articulated vehicle is operated on a severe curve, adjacently connected vehicle bodies are merely dragged without relative rotation and steering. Thus, operation capability of the articulated vehicle is significantly lowered. In a worse case, the vehicle is broken away or turned over.

Also, if a customer would have an application that sometimes requires a large conventional articulated vehicle, but mostly only a smaller one, this customer would either have to buy two sets of vehicles in the right size (but this costs a lot of money) or they would buy only one, large vehicle, which most of the time would be over-sized and thus not energy-efficient.

The present invention was designed to solve the aforesaid problems. The present invention provides an articulated vehicle, wherein, even if each wheel connected to a plurality of vehicles is individually suspended without having a steering function, rotation or steering of each vehicle body and the route of each vehicle wheel are selectively controlled to minimize fuel consumption and enhance traction force.

An articulated vehicle according to a preferred example of the present invention comprises:

a first vehicle body;

a first pair of wheels, which are individually suspended on both sides of the first vehicle body and can travel on the ground;

a second vehicle body, which is hingedly connected to the first vehicle body;

a second pair of wheels, which are individually suspended on both sides of the second vehicle body and can travel on the ground;

a regulator, which regulates the relative steering angle between the first vehicle body and the second vehicle body;

a mode selector, which selects a first mode and a second mode; and a controller, which receives the first mode signal or the second mode signal from the mode selector and controls the regulator according to the received signal, wherein the route of a second pair of wheels is regulated to be identical to the route of a first pair of wheels in the first mode; and the route of a second pair of wheels is regulated to be different from the route of a first pair of wheels in the second mode.

As another characteristic feature, the present invention provides an articulated vehicle comprising a drive unit, which individually drives a first pair of wheels and a second pair of wheels; and a transmission, which changes the speed of a first pair of wheels and the speed of a second pair of wheels.

And as another characteristic feature, the present invention provides an articulated vehicle, wherein the distance from the hinge to the first pair of wheels is equal to the distance from the hinge to the second pair of wheels.

And as another characteristic feature, the present invention provides an articulated vehicle, wherein the regulator regulates a first pair of wheels and a second pair of wheels to be linearly arranged without rotating the first vehicle body and the second vehicle body in the first mode.

And as another characteristic feature, the present invention provides an articulated vehicle, wherein the regulator regulates the steering angle between the first vehicle body and the second vehicle body so that the first wheels and the second wheels are arranged on a curve which forms a concentric circle with the vehicle center route in the first mode.

And as another characteristic feature, the present invention provides an articulated vehicle, wherein the route of the second wheels to repeatedly cross the route of the first wheels in the second mode.

And as another characteristic feature, the present invention provides an articulated vehicle, wherein the second vehicle body is regulated to repeat a clockwise rotation and a counterclockwise rotation on the basis of the first vehicle body.

An articulated vehicle according to another example of the present invention comprises:

a third vehicle body hingedly connected to the second vehicle body and a third pair of wheels, which are individually suspended on both sides of the third vehicle body and can travel on the ground, wherein the regulator regulates the relative steering angle between the first vehicle body and the second vehicle body and the relative steering angle between the second vehicle body and the third vehicle body;

the route of a third pair of wheels is regulated to be identical to the route of a first pair of wheels and a second pair of wheels in the first mode; and the route of a third pair of wheels is regulated to be different from the route of a first pair of wheels and a second pair of wheels in the second mode An articulated vehicle according to another example of the present invention comprises a drive unit, which individually drives a first pair of wheels, a second pair of wheels, and a third pair of wheels and a transmission, which changes the speed of a first pair of wheels, a second pair of wheels and a third pair of wheels.

According to an example of the present invention as stated above, modes vary depending on terrain or operation conditions. Specifically, in the first mode, each wheel route of adjacently connected vehicle bodies is regulated to be identical to minimize rolling frictions of the wheels of the following vehicle, which results in reducing fuel consumption. In the second mode, the wheel route of the preceding vehicle and the wheel route of the following vehicle are regulated to be different to increase traction force of the wheel of the following vehicle body, which allows easy operation of an articulated vehicle. That is, the articulated vehicle of the present invention achieves both a lower fuel consumption and easy operation.

Further, the present invention controls rotation and steering of mutually adjacent vehicle bodies, which enhances the operation capability and stability over severe terrain.

Further, unlike the conventional articulated vehicle, wherein the load is being taken by the vehicle body frame, which makes a design to counteract bending and torsional stresses necessary, which in turn results in increasing the vehicle weight and fuel consumption, the vehicle in the present invention is designed such that the load is mostly supported directly above the wheels, which makes a lighter frame design possible and due to decreased total mass results in an advantage of reducing fuel consumption.

BRIEF DESCRIPTION OF DRAWINGS

FIGS. 3a and 3b roughly illustrate the arrangement state and routes of the articulated vehicle wheels in the first mode, wherein FIG. 3a roughly illustrates the arrangement state of the first wheels and the second wheels;

FIG. 3b roughly illustrates the route of each wheel illustrated in FIG. 3a;

FIG. 4b roughly illustrates the route of each wheel illustrated in FIG. 4a;

FIGS. 5a and 5b roughly illustrates the arrangement state and route of the articulated vehicle in the second mode, wherein FIG. 5a roughly illustrates an example of a clockwise rotation and a counterclockwise rotation of each vehicle body;

FIG. 5b roughly illustrates the route of each wheel illustrated in FIG. 5a;

FIGS. 6a and 6b roughly illustrates an articulated vehicle, to which a third vehicle body is connected according to another example of the present invention, wherein FIG. 6a roughly illustrates an example of a clockwise rotation and a counterclockwise rotation of each vehicle body;

FIG. 6b roughly illustrates the route of each wheel illustrated in FIG. 6a; and

TERMS FOR DRAWING REFERENCE NUMERALS

1: articulated vehicle
10: first vehicle body
20: second vehicle body
30: third vehicle body
40: regulator
50: mode selector
60: controller

DETAILED DESCRIPTION

Below is an explanation on the examples of aspects of the present invention with reference to the drawings attached hereto.

Figure 1:
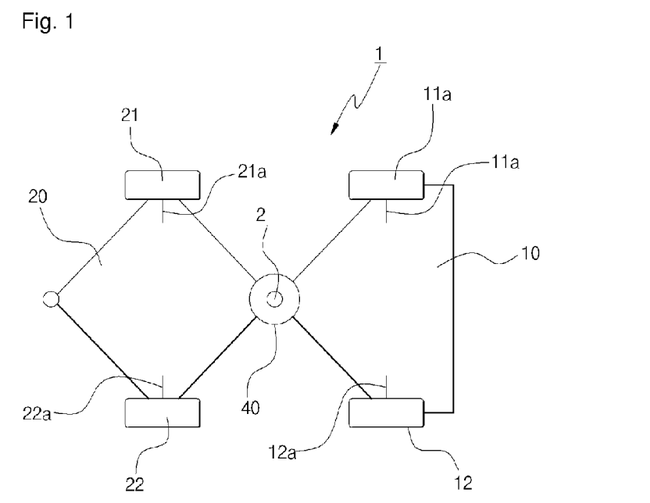
FIG. 1 is a perspective view that roughly illustrates an articulated vehicle according to an example of the present invention.
Figure 2:
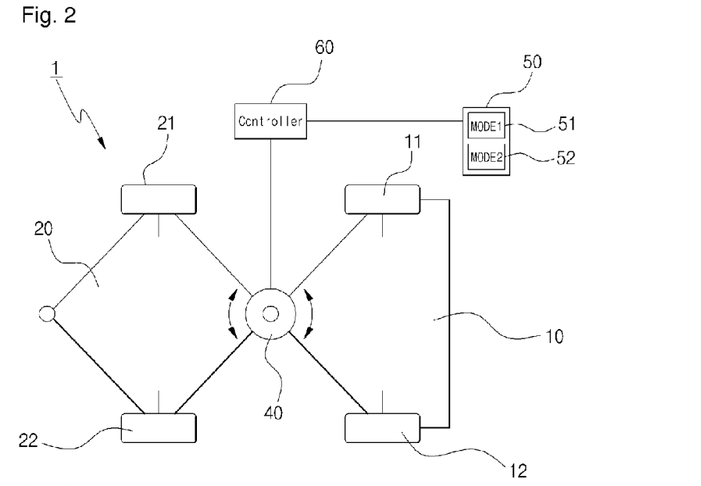
FIG. 2 roughly illustrates the relationship between the constitutions of the articulated vehicle according to FIG. 1.

FIG. 1 is a perspective view that roughly illustrates an articulated vehicle (1) according to an example of the present invention. FIG. 2 is a drawing that roughly illustrates the relationship between the constitutions of the vehicle (1) according to FIG. 1. The articulated vehicle (1) according to the present invention can move by being driven or pulled by a driving device equipped therein.

As shown in FIG. 1, in the articulated vehicle (1), the first vehicle body (10) and the second vehicle body (20) are hingedly connected and a plurality of vehicle bodies can be additionally connected. In the articulated vehicle (1) according to the present invention, for the vehicle's steering through the relative rotation between the vehicle bodies, vehicle bodies can be additionally hingedly connected. Below is an explanation on an articulated vehicle configured to comprise the first vehicle body (10) and the second vehicle body (20) for the sake of convenience.

When the present invention is practiced, there is a case that an articulated vehicle (1) travels in a relatively rough terrain. An excellent operation capability in such terrain will be defined as "terrainability" in the present invention. Preferably, as shown in FIG. 1, the articulated vehicle (1) according to the present invention is hingedly connected to each of the first vehicle body (10) and the second vehicle body (20), which constitute the vehicle body in order to convey and transmit earth and sand, stones and rocks, and construction materials and comprises each pair of wheels (11, 12, 21, 22).

That is, a first pair of wheels (11, 12) are configured on both sides of the first vehicle body (10) so that they can travel. A second pair of wheels (21, 22) are configured on both sides of the second vehicle body (20) so that they can travel. Herein, these wheels (11, 12, 21, 22) are individually suspended with respect to each of the first vehicle body and the second vehicle body (10, 20), and can rotate by a driving apparatus equipped therein or can travel by traction force.

Figure 6A:
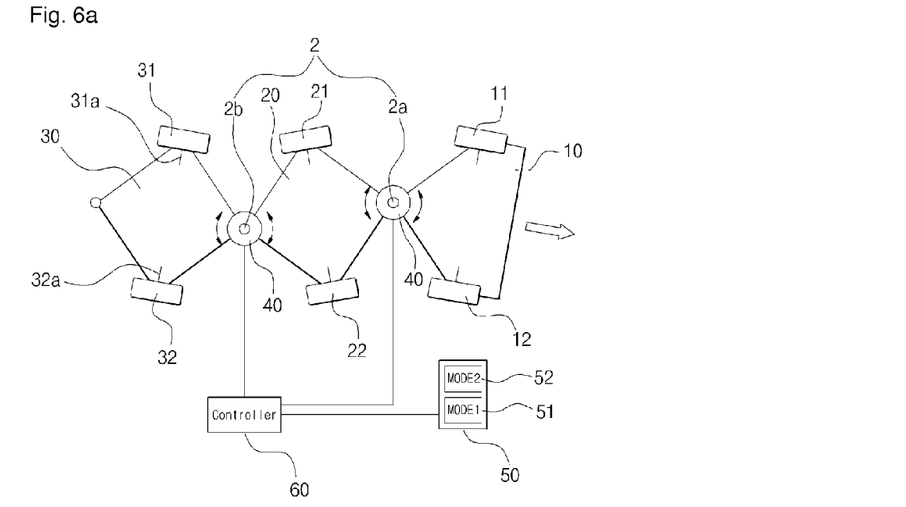
Figure 6B:
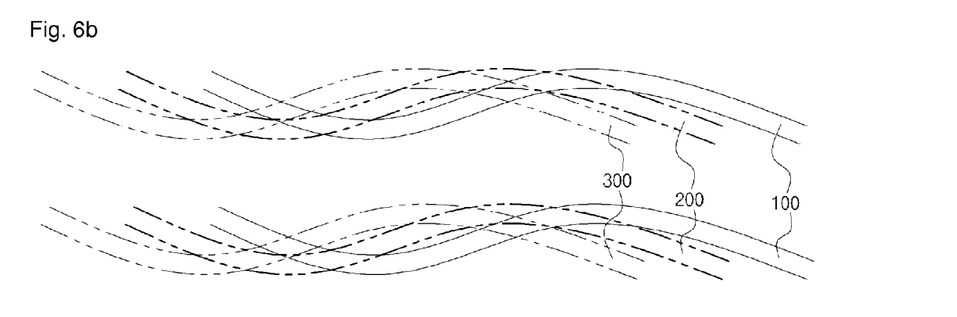

If necessary, like the articulated vehicle (1) according to another example of the present invention as shown in FIG. 6, the third vehicle body (30) can be hingedly connected to the second vehicle body (20), and the articulated vehicle can further comprises a third pair of wheels (31, 32), which are individually suspended on both sides of the third vehicle body (30) and can travel on the ground. A first pair of wheels and a second pair of wheels (10, 11 or 21, 22) can rotate through each wheel axis (11a, 12a, 21a, 22a) without an axle by which these wheels are mutually connected, and so can a third pair of wheels (31, 32).

The first wheels (11, 12), the second wheels (21, 22) and the third wheels (31, 32) are powered to rotate by a drive unit and not connected by an axle, and thus they can rotate while having respective rotational speeds. However, wheel steering cannot be individually regulated.

Preferably, the distance from the hinge (2) to the preceding first pair of wheels (11 or 12) is equal to the distance from the hinge (2) to the following second pair of wheels (21 or 22). Accordingly, the regulator (40) forms a symmetry structure. Such a symmetry structure is applied to the example of the third vehicle body (30) that is hingedly connected to the second vehicle body (20).

The articulated vehicle (1) according to the present invention comprises a regulator (40), which regulates the relative steering angle between the first and second vehicle bodies (10, 20), a mode selector (50) and a controller (60). Further, the articulated vehicle may comprise a drive unit for driving each wheel and a transmission for changing the speed of each wheel.

The regulator (40) regulates the relative steering angle between the first vehicle body (10) and the second vehicle body (20), and can be configured in various types by comprising a hydraulic apparatus or a gear apparatus and an electronic connection unit to change the relative steering angle between the first vehicle body (10) and the second vehicle body (20).

Figure 7:
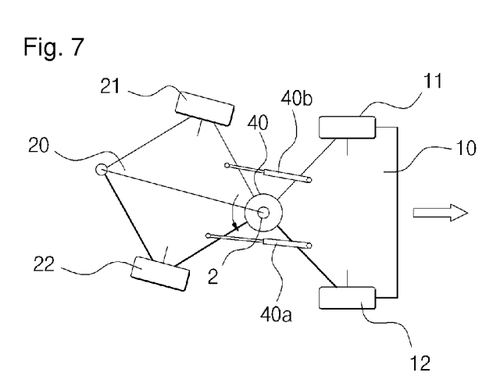
FIG. 7 roughly illustrates an articulated vehicle according to another example.

For example, as shown in FIG. 7, assuming that the regulator (40) is configured to comprise a pair of electromechanical linear actuators (40a, 40b), which are connected to one end of the first vehicle body (10) and the second vehicle body (20), the relative rotation between the vehicle bodies, e.g., a clockwise rotation and a counterclockwise rotation of the first vehicle body (10) and the second vehicle body (20) on the basis of the vertical axis of hinge (2), is regulated by contract and expand of a pair of electromechanical linear actuators (40a, 40b). The electromechanical linear actuators (40a, 40b) of the present invention can be replaced by other equivalent devices, such as, for example, hydraulic cylinders.

In the mode selector (50), a first mode (51) or a second mode (52) is selected by a driver (user). The mode selector may be in the shape of a switch or a lever. The mode information (the first mode (51) or the second mode (52) in the mode selector (50) is transmitted to the controller (60). The controller (60) controls the regulator (40) according to the first mode (51) or the second mode (52).

The controller (60) comprises a plurality of sensors and microprocessors. The sensors included in the controller (60) are a displacement sensor for sensing movement of the second vehicle body (20) that is relative to movement of the first vehicle body (10), a hydraulic pressure sensor for sensing the hydraulic pressure, which is required for relative movement of the first vehicle body (10) and the second vehicle body (20), or the difference in the hydraulic pressure, and a sensor for sensing traction force exerted on each wheel. Input and output signals from the controller (60) are variable, and the signals can be successively or dynamically controlled depending on time or signal cycle.

In the example, the sensor senses the steering angle and steering extent between the first vehicle body (10) and the second vehicle body (20), which are basically required. The relative steering angle between the first vehicle body (10) and the second vehicle body (20) can be regulated by the sensor.

The drive unit transmits power to each wheel (11, 12, 21, 22) and allows each wheel (11, 12, 21, 22) to rotate (roll) for the operation of each vehicle. The drive unit may comprise an electric or hydraulic motor and is individually mounted in each wheel (11, 12, 21, 22). The transmission changes or regulates the speed when each wheel is driven by power transmitted by the drive unit, and comprises a combination of gears. The transmission is mounted in each wheel (11, 12, 21, 22).

For example, when the first vehicle body (10) rotates, or the second vehicle body rotates, or the first vehicle body (10) and the second vehicle body (20) relatively rotate, the sensor senses such rotation information and the controller (60) outputs a control signal, which is required to regulate the relative steering angle, from the regulator (40). Accordingly, the relative steering angle, which is required for the first vehicle body (10) and the second vehicle body (20), is controlled depending on the control signal of the controller (60).

That is, in the first mode (51), the relative steering angle between the first vehicle body (10) and the second vehicle body (20), which changes centering the hinge, is controlled to be fixed or rigid. Accordingly, the first wheels (11, 12) of the first vehicle body (10) and the second wheels (21, 22) of the second vehicle body (20), which have no wheel steering function, are controlled to travel on the almost same route. For example, the second left wheel (21) travels along the route of the first left wheel (11) and the second right wheel (22) travels along the route of the first right wheel (11).

Accordingly, the second left and right wheels (21, 22) of the following second vehicle body (20) travel in the same direction as in the route (100) of the first left and right wheels (11, 12) of the first vehicle body (10). Thus, the rolling friction caused by contacting the second wheels (21, 22) with the ground can be minimized, which results in minimizing fuel consumption.

In the second mode (52), the relative steering angle between the first vehicle body (10) and the second vehicle body (20) is regulated so that the route (100) of a first pair of wheels of the first vehicle body (10) is different from the route (200) of a second pair of wheels (21, 22) of the second vehicle body (20). That is, in the second mode (52), a first pair of wheels (11, 12) of the first vehicle body (10) are preceding along the route (100), a second pair of wheels (21, 22) of the second vehicle body (10) follows along the route (200), and these routes (100, 200) can be formed to be different, although they should cross on at least one place.

Consequently, the second wheels (21, 22), which relatively follow, will be in contact with a fresh ground, and not the ground already deformed by the first wheels (11, 12), which precede, and have a stronger friction force. Accordingly, enough traction force is exerted on the second wheels (21, 22), which results in enhancing terrainability.

The different route as mentioned above may be shown in the form of a twist or a double helix, or a discontinuous or continuous triple helix depending on the number of vehicle bodies and the number of wheels, when each wheel route (100, 200) crosses in the second mode (52).

Meanwhile, in the another example of the present invention, as shown in FIG. 6, the regulator (50) is configured to comprise the hinge (2a) between the first vehicle body (10) and the second vehicle body (20) and the hinge (2b) between the second vehicle body (20) and the third vehicle body (30) in order to regulate the relative steering angle between the first vehicle body (10) and the second vehicle body (20).

Further, the articulated vehicle may comprise a drive unit, which individually drives a first pair of wheels (11, 12), a second pair of wheels (21, 22), and a third pair of wheels (31, 32) in respect of the first vehicle body (10) and the second vehicle body (20), and a transmission, which changes the speed of each wheel.

The regulator transmits power to each of the wheels (11, 12, 21, 22, 31, 32) and rotates these wheels (11, 12, 21, 22, 31, 32) for the operation of each vehicle.

In the example, in the first mode (51), the route of a third pair of wheels (31, 32) is regulated to be identical to the route of a first pair of wheels (11, 12) and the route of a second pair of wheels (21, 22). In the second mode (52), the route of a third pairs of wheels (31, 32) is regulated to be different from the route of a first pair of wheels (11, 12) and a second pair of wheels (21, 22). Further, the controller (60) further comprises an angle displacement sensor for sensing the relative steering of the second vehicle body (20) and the third vehicle body (30) or a hydraulic pressure sensor. The controller (60) outputs a control signal required for regulating the relative steering angle, e.g., a signal regarding angle displacement or hydraulic pressure, from the regulator (40). Depending on the control signal of the controller (60), the relative steering angle between the second vehicle body (20) and the third vehicle body (30) is controlled.

In such example, the relative steering angle between the first vehicle body (10), the second vehicle body (20), and the third vehicle body (30), which varies centering the hinge (2a or 2b), is controlled to be fixed or rigid in the first mode (51). Accordingly, the first wheels (11, 12) of the first vehicle body (10), the second wheels (21, 22) of the second vehicle body (20), and the third wheels (31, 32) of the third vehicle body (30), which have no wheel steering function, are controlled to travel on the almost same route.

For example, the left wheels (21, 31) for the second vehicle body and the third vehicle body (20, 30) are regulated to be almost the same as the route of the first left wheel (11) of the preceding first vehicle body (10). Similarly, the right wheels (22, 32) of the second vehicle body and the third vehicle body (20, 30) are regulated to be almost the same as the route of the left wheel (11).

In the second mode (52), as well as the relative steering angle between the first vehicle body (10) and the second vehicle body (20), the steering angle between the second vehicle body (20) and the third vehicle body (30) is also regulated by the sensor and the regulator (60). In the second mode (52), the relative steering is regulate so that the route (100) of a first pair of wheels (11, 12) of the first vehicle body (10), the route (200) of a second pair of wheels (21, 22) of the second vehicle body (20), and the route (300) of a third pair of wheels (31, 32) of the third vehicle body (30) are different.

That is, in the second mode (52), a first pair of wheels (11, 12) precedes according to the route (100) for the first vehicle body (10), a second pair of wheels (21, 22) follows according to the route (200) for the second vehicle body (20), and a second pair of wheels (21, 22) follows again according to the route (300) for the third vehicle body (30). Each of the routes (100, 200, 300) can be formed to be different, although they should cross on at least one place. In this case, the speeds of the first wheels (11, 12), the second wheels (21, 22), and the third wheels (31, 32), which are operated by the drive unit and the transmission, can be regulated to be different.

Accordingly, the first wheels (11, 12), the second wheels (21, 22), and the third wheels (31, 32), which do not have no wheel steering function, will travel on the different route due to the relative rotation and steering for the vehicle body, as stated above. The different route can have a continuous or discontinuous triple helix form or a multiple helix form, including a straight line.

Ultimately, the second wheels (21, 22) and the third wheels (31, 32), which are relatively following wheels, will be in contact with a fresh ground, and not the ground already deformed by the first wheels (11, 12), which are relatively preceding wheels, and thus will have a stronger friction force.

Accordingly, sufficient traction force is exerted on the second wheels (21, 22) and the third wheels (31, 32), which are the following wheels, and terrainability can be further enhanced.

Below is an explanation on the operation of the articulated vehicle (1) in each of the first mode (51) and the second mode (52).

Figure 3A:
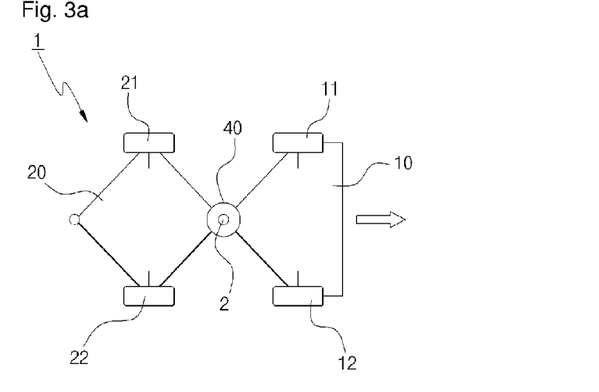
Figure 3B:
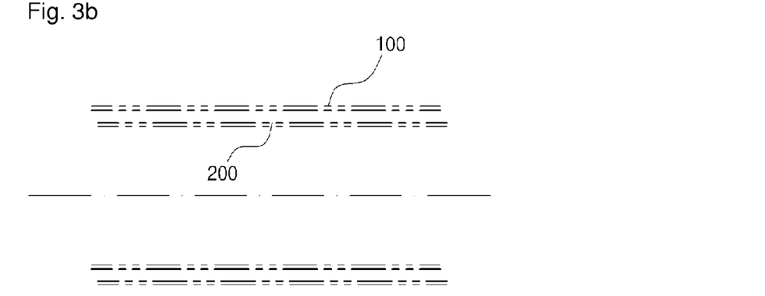

FIG. 3 roughly illustrates the arrangement state and routes of the wheels of the articulated vehicle (1) in the first mode (51). The articulated vehicle (1) according to the present invention can be operated on the ground that is relatively flat and firm. Where the articulated vehicle (1) travels straight ahead, such traveling may be not only for long distance or long time but also on one moment.

FIG. 3 illustrates this case, which corresponds to any one case of the operation in the first mode (51). A driver selects the first mode (51) from the mode selector (50). The controller (60) controls the regulator (40) according to the signal regarding the first mode (51) transmitted to the controller (60) so that the first vehicle body (10) and a first pair of wheels thereof (11, 12) and the second vehicle body (20) and a second pair of wheels thereof (21, 22) can be arranged, as shown in FIG. 3.

For example, the first vehicle body (10) and the second vehicle body (20) are controlled so that a first pair of wheels (11, 12) and a second pair of wheels (21, 22) can be linearly arranged without the relative rotation centering the hinge (2) by the hydraulic control signal of the controller (60), e.g., in the manner of fixing the hydraulic pressure of the hydraulic pressure cylinder (40a, 40b) or change or difference in the hydraulic pressure.

Since the relative rotation and steering between the first vehicle body (10) and the second vehicle body (20) is fixed, the first wheels (21, 22) and the second wheels (31, 32) only roll on the ground without separate steering. Thus, the speed of a first pair of wheels and the speed of a second pair of wheels (21, 22), which are driven by the drive unit and the transmission, are maintained constant.

In such case, the first wheels (11, 12) and the second wheels (21, 22) travel straight ahead while maintaining their specific linear form, and the route (200) for the following second wheels (21, 22) is identical to the route (100) for the preceding first wheels (11, 12). In this situation, the first wheels (11, 12) and the second wheels (21, 22) merely roll, without dragging. Since the following second wheels (21, 22) can minimize the rolling friction caused by being in contact with the ground, the fuel consumption can be minimized.

Figure 4A:
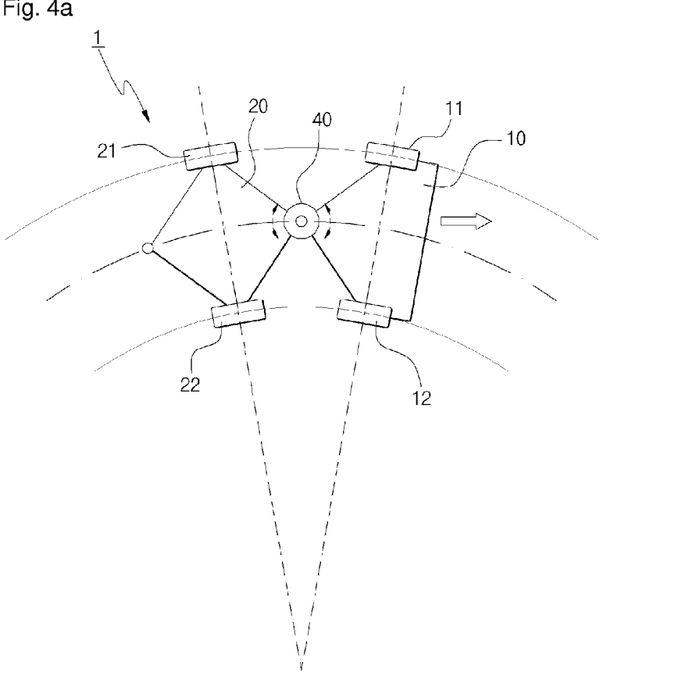
FIGS. 4a and 4b roughly illustrates the arrangement state and routes of the vehicle wheels in another first mode, wherein FIG. 4a roughly illustrates the arrangement state of the first vehicle body and the second vehicle body and each wheel.
Figure 4B:
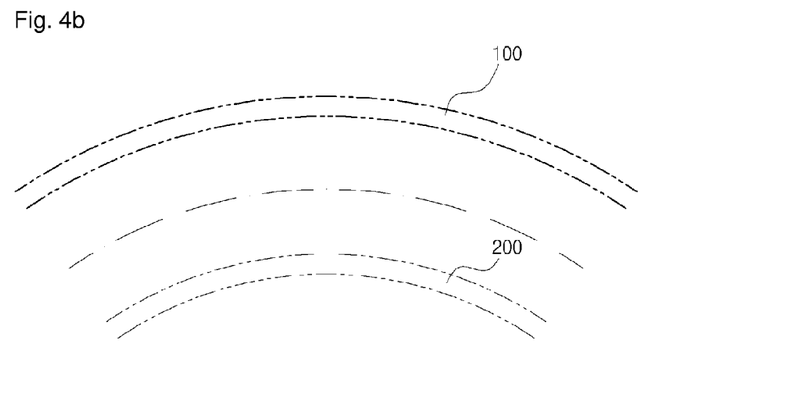

FIG. 4 roughly illustrates the arrangement state and routes of the wheels of the articulated vehicle (1) in the first mode (51) of another shape. The articulated vehicle (1) according to the present invention, unlike in FIG. 3, may happen to travel on a curve. However, such traveling on a curve may be not only for long time or long distance but also on a moment. FIG. 4 illustrates this case, which corresponds to any one case of the operation in the first mode (51). In the first mode (51) with this type, the routes (100, 200) of the first wheels (11, 12) and the second wheels (21, 22) are identical, and thus are controlled to be arranged on a curve.

Particularly, in order to minimize the dragging occurred in the first wheels (11, 12) and the second wheels (21, 22), the first wheels (11, 12) and the second wheels (21, 22) are arranged on a curve which forms a concentric circle with the route of the center (C) of the first vehicle body (10 and the second vehicle body (20) or the hinge (2). Then, each of the wheels (11, 12, 21, 22) can be controlled to rotate with the individual rotational speeds. For example, compared to the center of the vehicle body, the wheel in the inner part of a curve will be controlled to rotate slower by a specific amount and the wheel on the outer part of a curve will be controlled to rotate faster by the same specific amount.

Even under such situation, the first wheels (11, 12) and the second wheels (21, 22) only roll, and thus the dragging is minimized. The rolling friction caused by contacting the second wheels (21, 22) with the ground can be minimized, which results in minimizing the fuel consumption FIG. 5 roughly illustrates the steering state by the relative rotation between the adjacent first vehicle body (10) and second vehicle body (20) and routes of the wheels in the second mode (52). The articulated vehicle (1) according to the present invention can be operated on the ground that is not firm, in which case, it is advantageous to secure terrainability by operation according to the second mode (52). That is, the second wheels (21, 22) do not follow the ground deformed by the first wheels (11, 12), but can be in contact with a fresh ground to exhibit excellent traction force.

Figure 5A:
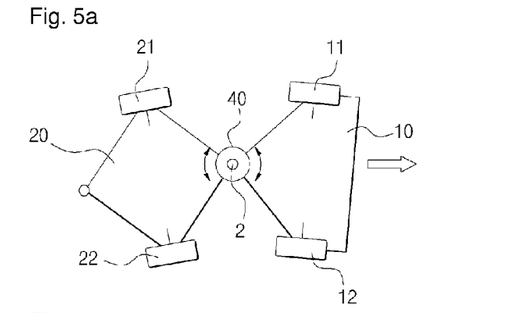
Figure 5B:
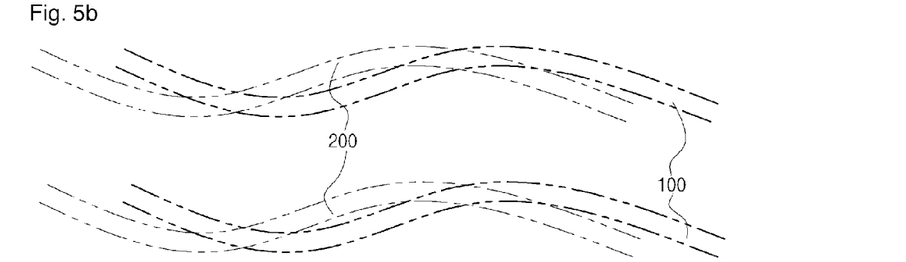

FIG. 5 illustrates this case, which corresponds to any one of the operation in the second mode (52). A driver selects the second mode (52) from the mode selector (50). The controller (6) controls the regulator (40) according to the signal regarding the second mode (52) transmitted to the controller so that the wheels are arranged as illustrated in FIG. 5a. The regulator (40) regulates the steering angle between the first vehicle body (10) and the second vehicle body (20) to repeat rotation in the range of a certain angle when the vehicle temporarily stops, slows down, or rapidly travels. For example, the regulator (40) can regulate the first vehicle body (10) and the second vehicle body (20) to repeat a clockwise rotation and a counterclockwise rotation centering the hinge (2) by controlling the contract and expand of each electromechanical linear actuators (40a, 40b).

In this case, the speed of a first pair of wheels (11, 12) and the speed of a second pair of wheels (21, 22) driven by the drive unit and the transmission can be regulated to be different. Further, the change in the repetitive rotation and steering angle between the first vehicle body (10) and the second vehicle body (20) may be large or small, and regular or irregular.

As shown in FIG. 5a, although the first wheels (11, 12) and the second wheels (21, 22) can travel on each wheel axis (11a, 12a, 21a, 22a) without separate steering, they are controlled to cross the route (200) of the second wheels (21, 22) and the route (100) of the first wheels (11, 12) by repeating a clockwise rotation and a counterclockwise rotation between the first vehicle body (10) and the second vehicle body (20). The route (100) of a first pair of wheels (11, 12) and the route (300) of a second pair of wheels (21, 22) become different by a clockwise rotation and a counterclockwise rotation between the first vehicle body (10) and the second vehicle body (20).

In such situation, although the preceding first wheels (11, 12) and/or the following second wheels (21, 22) may partly be dragging, at least the following second wheels (21, 22) do not pass the ground deformed by the first wheels (11, 12), but are in contact with a fresh ground. Thus, sufficient friction force will be exerted on the wheels. Consequently, the traction force is enhanced and excellent terrainability is exhibited.

FIG. 6 roughly illustrates the arrangement state of the articulated vehicle, to which the third vehicle body (30) is additionally connected according to another example of the present invention. In this example, the third vehicle body (30) is hingedly connected to the second vehicle body (20), and the regulator (40) regulates the relative rotation between the second vehicle body (20) and the third vehicle body (30) as well as the relative rotation between the first vehicle body (10) and the second vehicle body (20).

Further, in the first mode, as the rotation and steering of all the vehicle bodies (10, 20, 30) are fixed, the following left wheels (21, 31) travel to be identical to the route of the preceding left wheel (11) and the following right wheels (12, 22, 32) also travel to be identical to the route of the preceding right wheel (12). Thus, a detailed explanation regarding this will be omitted.

In the example, a driver selects the second mode (52) through the mode selector (50). The controller (60) controls the regulator (40) according to the signal regarding the second mode (52) transmitted to the controller (60) so that the wheels can be arranged as shown in FIG. 6.

In consideration of terrain conditions, angle when the vehicle temporarily stops, slows down, or rapidly travels, the regulator (40) can regulate the steering angle between the first vehicle body (10) and the second vehicle body (20) to repeat rotation in the range of a certain angle. For example, although not shown in the drawings, the regulator (40) can regulate the first vehicle body (10) and the second vehicle body (20) to repeat a clockwise rotation and a counterclockwise rotation centering the hinge (2a, 2b) by controlling the contract and expand of a plurality of electromechanical linear actuators. That is, although a first pair of wheels (11, 12) or a second pair of wheels (21, 22) and/or a third pair of wheels (31, 32) rotate on each wheel axis (11a, 12a, 21a, 22a, 31a, 32a) without separate steering, for the relative rotation of individual vehicle, the regulator (40) receives the control signal from the controller (60) to repeat a clockwise rotation and a counterclockwise rotation between the first vehicle body (10) and the second vehicle body (20) centering the hinge (2a) and a clockwise rotation and a counterclockwise rotation between the second vehicle body (20) and the third vehicle body (30) centering the hinge (2b).

In this case, the range of the repetitive steering angle between the first vehicle body (10) and the second vehicle body (20) and/or the second vehicle body (20) an the third vehicle body (30) may be significantly large or small, and regular or irregular depending on time, cycle signal or terrain conditions. This may be understood to mean that depending on the terrain conditions, where at least one vehicle body of the first vehicle body (10), the second vehicle body (20) and the third vehicle body (30), e.g., the second vehicle body (20), is curved with a relatively large angle compared to the remaining vehicle bodies, e.g., the first vehicle body (10) and the third vehicle body (30), each vehicle body (10, 20, 30) can re-travel while repeating a clockwise rotation and a counter-clockwise rotation.

Ultimately, in the second mode (52) related to this example, traveling of a first pair of wheels (11, 12) or a second pair of wheels (21, 22) and/or a third pair of wheels (31,32) may display different routes, such as a triple twist form, including a straight line, or a triple helix form, or a multiple helix form.

Herein, although the first wheels (11, 12), the second wheels (21, 22) or the third wheels (31, 32) may partly be dragging, the following second wheels (21, 22) will not pass on the ground deformed by the preceding first wheels (11, 12), and the following third wheels (31, 32) will not also pass on the ground deformed by the second wheels (21, 22) or the first wheels (11, 12).

Accordingly, at least the following second pair of wheels (21, 22) and/or third pair of wheels (31, 32) become in contact with a fresh ground, and thus can display sufficient friction force, which results in enhanced traction force and excellent terrainability.

The vehicle bodies can be configured to comprise more than three in the same principle.

As stated above, the present invention can be variously modified within the scope of protection defined in the claims by a person having an ordinary skill in the art to which the invention pertains. Accordingly, the technical protection scope of the present invention is not limited to the preferred examples set out above.

The wheels are controlled by the rotation and steering of the mutually connected vehicle bodies. In the first mode, the route of the wheels of the preceding vehicle and the route of the wheels of the following vehicle can be controlled to be identical in various types. In the second mode, the route of the wheels of the preceding vehicle and the route of the wheels of the following vehicle can be controlled to be different in various types, such as a continuous or discontinuous twist form or a triple helix form, or a multiple helix form. The first mode and the second mode can be optionally selected by a driver to enhance fuel consumption or to achieve terrainability.

The invention claimed is:

1. An articulated vehicle with a controllable wheel route, comprising:
    a first vehicle body;
    a first pair of wheels, which are individually suspended on both sides of the first vehicle body, and can travel on the ground;
    a second vehicle body hingedly connected to the first vehicle body, a second pair of wheels, which are individually suspended on both sides of the second vehicle body, and can travel on the ground;
    a regulator, which regulates a relative steering angle between the first vehicle body and the second vehicle body;
    a mode selector, which is configured to select a first mode and a second mode; and
    a controller, which receives the first mode signal or the second mode signal from the mode selector and controls the regulator according to the received signal, wherein the route of a second pair of wheels is regulated to be identical to the route of a first pair of wheels in the first mode, and the route of a second pair of wheels is regulated to be different from the route of a first pair of wheels in the second mode.

2. The articulated vehicle with a controllable wheel route according to claim 1, wherein the distance from the hinge to a first pair of wheels is equal to the distance from the hinge to a second pair of wheels.

3. The articulated vehicle with a controllable wheel route according to claim 1, wherein the regulator regulates a first pair of wheels and a second pair of wheels to be linearly arranged, without allowing the first vehicle body and the second vehicle body to rotate in the first mode.

4. The articulated vehicle with a controllable wheel route according to claim 1, wherein the regulator regulates the steering angle between the first vehicle body and the second vehicle body so that a first pair of wheels and a second pair of wheels can be arranged on it curve which forms a concentric circle with the route of the vehicle center in the first mode.

5. The articulated vehicle with a controllable wheel route according to claim 1, wherein the regulator regulates the route of a second pair of wheels to repeatedly cross the route of a first pair of wheels in the second mode.

6. The articulated vehicle with a controllable wheel route according to claim 5, wherein the second vehicle body is regulated to repeat a clockwise rotation and a counterclockwise rotation on the basis of the first vehicle body.

7. The articulated vehicle with a controllable wheel route according to claim 1, further comprising a drive unit, which individually drives a first pair of wheels and a second pair of wheels; and a transmission, which changes the speed of a first pair of wheels and the speed of a second pair of wheels.

8. The articulated vehicle with a controllable wheel route according to claim 1, further comprising a third vehicle body, which is hingedly connected to the second vehicle body, and a third pair of wheels, which are individually suspended on both sides of the third vehicle body and can travel on the ground, wherein the regulator regulates a relative steering angle between the first vehicle body and the second vehicle body and a relative angle between the second vehicle body and the third vehicle body; the route of a third pair of wheels is regulated to be identical to the route of a first pair of wheels and the route of a second pair of wheels in the first mode; and the route of a third pair of wheels is regulated to be different from the route of a first pair of wheels and the route of a second pair of wheels in the second mode.

9. The articulated vehicle with a controllable wheel route according to claim 8, further comprising a drive unit, which individually drives a first pair of wheels, a second pair of wheels and a third pair of wheels; and a transmission, which changes the speed of a first pair of wheels, the speed of a second pair of wheels and the speed of a third pair of wheels.

* * * * *